Figure 1:
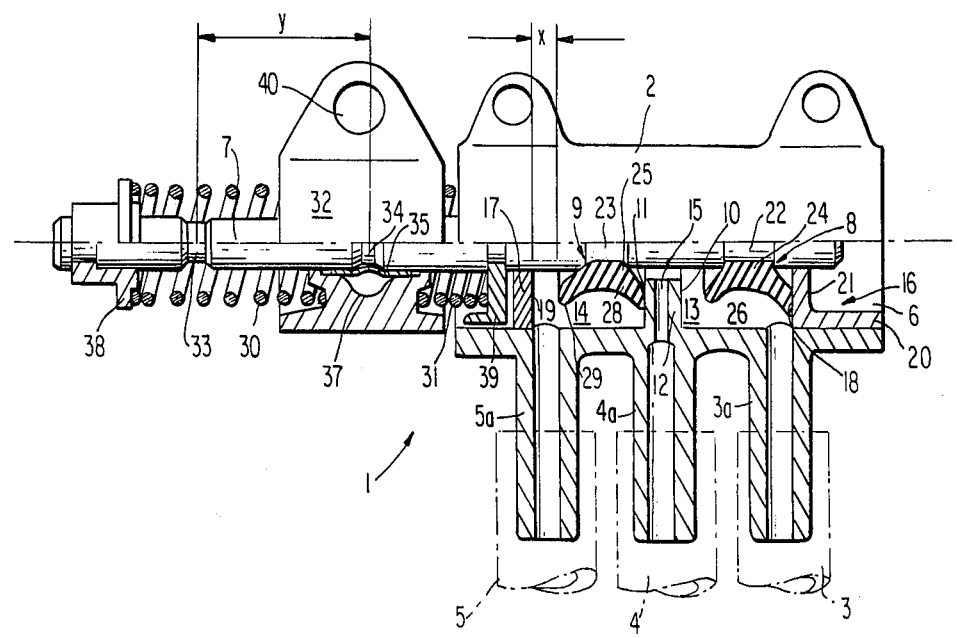

United States Patent [19]

Hoffmann et al.

[11] 4,287,915

[45] Sep. 8, 1981

[54] CONTROL VALVE FOR PNEUMATIC CONDUITS

[75] Inventors: Rüdiger Hoffmann, Sindelfingen; Dieter Feichtiger, Aidlingen, both of Fed. Rep. of Germany

[73] Assignee: Daimler-Benz Aktiengesellschaft, Stuttgart, Fed. Rep. of Germany

[21] Appl. No.: 151,988

[22] Filed: May 21, 1980

[30] Foreign Application Priority Data

Jun. 2, 1979 [DE] Fed. Rep. of Germany ....... 2922681

[51] Int. Cl.³ .............................................. F16K 31/44
[52] U.S. Cl. .................................. 137/625.5; 251/77; 251/81; 251/297
[58] Field of Search .................. 137/625.5, 625.48; 251/77, 297, 81

[56] References Cited

U.S. PATENT DOCUMENTS 2,616,658 11/1952 Dombeck ......................... 137/625.5
3,018,797 1/1962 Parks .................................... 251/77 X Primary Examiner—Arnold Rosenthal
Attorney, Agent, or Firm—Craig and Antonelli

[57] ABSTRACT

A control valve for controlling a routing of a pressure medium in pneumatic conduits, especially those in motor vehicles, wherein the control valve includes a housing provided with a cylindrical recess and a control slide guided in the cylindrical recess in a longitudinally-displaceable fashion. A gasket or sealing arrangement is provided by means of which a central pneumatic conduit is alternatingly connected, after an operating stroke of the control slide, to a pneumatic conduit lying to the left and to the right of the central pneumatic conduit. The control valve further includes an operating sleeve longitudinally displaceable between two compression springs supported on the control slide and between two detent locations. The operating sleeve is arranged on the control slide in such a way that, upon operation of the operating sleeve, the control slide is braked as soon as sealing elements of the sealing arrangement abut against respective opposite valve seat surfaces. The operating sleeve during a further stroke, upon exceeding a specific resistance, is disengaged from one detent location and, upon further axial displacement, engages into the other detent location against the force or strength of one of the compression springs.

14 Claims, 2 Drawing Figures

CONTROL VALVE FOR PNEUMATIC CONDUITS

The present invention relates to a control arrangement, and, more particularly, to a control valve for controlling the path or routing of a pressure medium in a pneumatic conduit, especially pneumatic conduits of motor vehicles, which valve includes a housing provided with a cylindrical recess and a control slide longitudinally displaceably guided in the recess, with a sealing means being provided at the control slide for alternatingly connecting a central pneumatic conduit to a pneumatic conduit lying to the left and to the right of the central conduit after an execution of an operating stroke by the control slide.

In German Pat. No. 2,444,357 a control valve for pneumatic conduits is proposed wherein radially-acting sealing lips slide along a wall of a cylindrical recess of the control valve. A disadvantage of this proposed construction resides in the fact that lubrication is required to ensure an operation of the control valve; however, by virtue of the use of lubrication, dirt particles are attracted and deposited between the housing and the sealing lips causing leaks.

The aim underlying the present invention essentially resides in providing a control valve for pneumatically-operated devices wherein longitudinal changes in an operating linkage of the control valve have no effect on the sealing function of the control valve, and wherein short response times for the control valve can be maintained.

In accordance with advantageous features of the present invention, an operating sleeve, displaceable longitudinally between two detent locations and between two compression springs, is supported on the control slide. The operating sleeve is arranged on the control slide in such a way that, upon operation of the operating sleeve by a control linkage, the control slide is braked as soon as the sealing elements abut against their respective opposite valve seat surfaces, and the operating sleeve, during its further stroke, upon exceeding a specific resistance, is disengaged from one detent location and, upon further axial displacement, engages into the other detent location against the force or strength of one of the compression springs.

In accordance with further advantageous features of the present invention, a sealing or gasket arrangement includes two axially-acting sealing elements fixedly placed on the control slide with the sealing elements being displaceably arranged respectively between two mutually-opposed valve seat surfaces provided at a side of the housing of the control valve.

Advantageously, in accordance with further features of the present invention, the housing is provided with a collar which projects into a cylindrical recess, which collar includes a central pneumatic conduit. A bore connected to the central pneumatic conduit and terminating in the recess is arranged in the collar. The valve seat surfaces for the respective sealing elements are located at the collar and opposed valve seat surfaces are formed by inserts attached within the recess of the housing of the control valve.

In accordance with still further features of the present invention, each sealing element is composed of a firm elastic annular member and of a soft elastic sealing lip which projects from the annular member on both sides thereof.

In accordance with still further features of the present invention, the control slide is provided with detent grooves and a spring is mounted in the operating sleeve, which spring is adapted to lockingly engage in one of the detent grooves in such a manner that the detent mechanism withstands the force of the compressed compression springs between the which the operating sleeve is disposed.

Advantageously, according to the present invention, one of the ends of the compression spring is supported in recesses of the operating sleeve and the other ends are supported on supporting rings firmly connected to the control slide.

Accordingly, it is an object of the present invention to provide a control valve arrangement for controlling the path or routing of a pressure medium in pneumatic conduits which avoids, by simple means, shortcomings and disadvantages encountered in the prior art.

Another object of the present invention resides in providing a control valve arrangement for controlling a path or routing of a pressure medium in pneumatic conduits which does not require a lubrication of the sealing elements thereof.

Yet another object of the present invention resides in providing a control valve arrangement for controlling a path or routing of the pressure medium in pnuematic conduits which is insensitive to dirt and almost relatively free of wear and tear.

A further object of the present invention resides in providing a control valve arrangement for controlling a path or routing of a pressure medium in pneumatic conduits which utilizes long operating strokes but provides short switching paths thereby enabling brief response times of the control valve.

A still further object of the present invention resides in providing a control valve arrangement for controlling a path or routing of a pressure medium in pneumatic conduits wherein a safe and reliable seal is ensured under all operating conditions.

Yet another object of the present invention resides in providing a control valve arrangement for controlling a path or routing of a pressure medium in pneumatic conduits which is simple in construction and therefore relatively inexpensive to manufacture.

Figure 2:
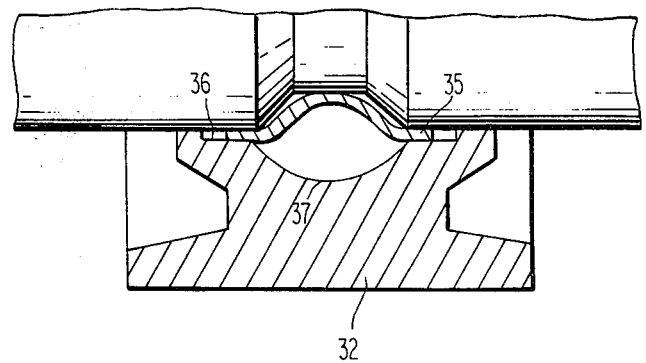

These and other objects, features, and advantages of the present invention will become more apparent from the following description when taken in connection with the accompanying drawings, which show, for purposes of illustration only, one embodiment in accordance with the present invention, and wherein:

FIG. 1 is a longitudinal partial cross-sectional view of a control valve in accordance with the present invention; and FIG. 2 is an enlarged cross-sectional view of a detail of the control valve of FIG. 1.

Referring now to the drawings wherein like reference numerals are used in both views to designate like parts and, more particularly, to FIG. 1, according to this figure, a control valve generally designated by the reference numeral 1 employed for, for example, controlling pneumatically-operated devices of a motor vehicle such as a central locking mechanism, includes a cylindrical housing 2 with three seriesarrangedconnections 3a, 4a, 5a, as viewed in the longitudinal direction, for accommodating pneumatic conduits 3, 4, 5 and a bolt-shaped slide 7 longitudinally displaceably guided in a cylindrical recess 6 of the housing 2. Annular sealing elements or gaskets generally designated by the reference numerals 8,9 are arranged on the control slide 7. Advantageously, the housing 2 of the control valve 1 and the connections 3a, 4a, 5a are made in one piece from a synthetic resinous material.

The housing 2 of the control valve 1 includes an internally-disposed collar 12 forming two planar valve seat surfaces 10,11 cooperable with the annular sealing elements 8,9. A passage bore 15 is arranged in the collar 12 and extends from the central connection 4a and serves to communicate the central connection 4a with either an annular chamber 13 or an annular chamber 14 in dependence upon a position of the control slide 7. Both annular chambers 13,14 are defined by an insert generally designated by the reference numeral 16 and an insert 17 which form planar valve seats 18,19, respectively opposed to the valve seats 10,11, and cooperable with the annular sealing elements 8,9. The insert 17 is of a disk-shape and is sealing arranged in the cylindrical recess 6 by either being clipped into a recess in an inner wall of the cylindrical recess 6 or by being welded to the wall of the recess 6. The insert 16 is formed of a bushing 20 provided with a collar portion 21 which serves as an abutment. Advantageously, the insert 16 is welded to the inner wall of the recess 6 and/or to the housing 2 of the control valve 1.

The annular sealing elements 8,9, constructed as ribs, include a central hard elastic ring member or portion 24,25 adapted to lie in grooves 22,23 of the control slide 7 and soft elastic sealing lips 26,27 and 28,29 which respectively project laterally from the ring portions 24,25. The sealing lips 26,28 respectively sealingly contact the valve seat surfaces 11,18 under tension in the manner illustrated in FIG. 1 so that the centrally-mounted conduit is connected to the conduit 3 lying to the right thereof.

An operating sleeve 32, lying between two compression springs 30,31, is arranged on a part of the control slide 7 projecting from the housing 2 of the control valve 1. The operating sleeve 32 is displaceably supported between two detent grooves 33,34 on the control slide 7 which grooves 33,34 serve to define detent locations or end points of the displacement path of the operating slide 32. A spring 35 is locked in the detent groove 34 and is clamped into an annular groove 36 (FIG. 2) of the operating sleeve 32. In addition to the groove 36, a trough-shaped indentation 37 is provided in the operating sleeve 32 to accommodate a stroke of the spring 35.

The compression spring 30 is supported on a supporting ring 38 arranged at an end side of the control slide 7 and the compression spring 31 is supported on a supporting ring 39 located approximately at a longitudinal center of the control slide 7.

In use, the housing 2 of the control valve 1 is fixedly mounted at a portion of the vehicle with an operating linkage (not shown) being adapted to engage the operating sleeve 32 at an articulating point 40.

To eliminate a connection or communication of the pneumatic conduit 4 to the conduit 3, and to connect the conduit 4 to the conduit 5, the operating sleeve 32 is shifted by the operating linkage. After an operating stroke distance x is traversed, the sealing lips 27,29 respectively come into contact with the valve seat surfaces 10,19. The operating sleeve is advanced uniformly by the operating linkage; whereas, the control slide 7 is braked by virtue of the cooperation between the annular sealing elements 8,9 and the sealing surfaces 10,19. After exceeding a certain resistance caused by the sealing elements 8,9, the operating sleeve 32 is disengaged and shifted against the force of the compression spring 30 until the spring 35 associated with the operating sleeve 32 engages the detent groove 33. The strength of the detent mechanism, i.e., spring 35 and detent groove 33, is so great that it withstands the force of a compressed compression spring 30.

The compression springs 30,31 serve the task of ensuring the contacting of the annular sealing elements 8,9 against the respective valve seat surfaces during a displacement of the operating sleeve 32 from one detent location to the other, i.e., from the groove 34 to the groove 33.

The arrangement of the compression springs 30,31 as well as the detent locations defined by the grooves 33,34 provides long operating strokes but short switching paths thereby enabling brief response times for the control valve 1 since, upon an operation of the operating sleeve 32, the operating sleeve 32 effects a switching over of the control valve after traversing a stroke corresponding to the functional stroke distance x which takes places prior to a displacement over the complete operating stroke distance y.

While we have shown and described only one embodiment in accordance with the present invention, it is to be understood that the invention is not limited thereto but is susceptible of numerous changes and modifications as are obvious to those of ordinary skill in the art, and we therefore do not wish to be limited to the details shown and described herein but intend to cover all such changes and modifications as known to one skilled in the art.

What is claimed is:

1. A control valve for controlling a routing of a pressure medium from a central pneumatic conduit to further pneumatic conduits disposed to the left and right of the central pneumatic conduit, the control valve including a housing provided with a cylindrical recess, a control slide means longitudinally displaceably guided in the cylindrical recess, and valve sealing means for alternatingly communicating the central pneumatic conduit with the further pneumatic conduits disposed to the left and right thereof upon execution of an operating stroke of the control slide means, characterized in that the control valve further includes two compression spring means supported on the control slide means, an operating sleeve longitudinally displaceably supported on the control slide means between the two compression springs, detent means for defining respective end positions of the displacement path of the operating sleeve, and means for enabling an axial displacement of the operating sleeve such that the operating sleeve, upon exceeding a predetermined resistance, is disengaged from one of the detent means, and, upon further axial displacement, engages in the other detent means against a force of one of the compression spring means.

2. A control valve according to claim 1, characterized in that the control valve further includes valve seat surfaces cooperable with the valve sealing means and associated with each of the pneumatic conduits, said valve sealing surfaces being disposed in the cylindrical recess so as to enable a braking of the control slide as soon as the sealing elements abut against the sealing surfaces.

3. A control valve according to claim 2, characterized in that the valve sealing means includes two spaced axially-acting sealing members fixedly mounted on the control slide means so as to be displaceable therewith between the respective valve seat surfaces.

4. A control valve according to claim 3, characterized in that the control valve means further includes a collar means for projecting into the cylindrical recess for dividing the cylindrical recess into two annular chambers disposed to the left and right of the central pneumatic conduit and respectively communicating with the further pneumatic conduits disposed to the left and right of the central pneumatic conduit, and a bore means provided in the collar means for communicating the central pneumatic conduit with the respective annular chambers in dependence upon the positioning of the control slide means.

5. A control valve according to claim 4, characterized in that the valve seat surfaces are formed on opposite sides of the collar means, insert means are disposed in the recess means at positions spaced from the opposite sides of the collar means forming the valve seat surface for defining the ends of the respective annular chambers, and in that surfaces of the respective insert means facing the collar portion form the valve seat surfaces.

6. A control valve according to claim 5, characterized in that the inserts are sealingly attached with the cylindrical recess of the housing.

7. A control valve according to one of claims 3, 4, 5 or 6, characterized in that each sealing member includes a firm elastic annular portion seated on the control slide means and soft elastic sealing lips projecting from each side of the elastic annular portion.

8. A control valve according to claim 7, characterized in that the detent means includes annular grooves provided in the control slide means, and spring means mounted on the operating sleeve for lockingly engaging the respective annular grooves with a sufficient force to withstand a force of a compression of the compression spring means.

9. A control valve according to claim 8, characterized in that a supporting ring is firmly connected to an end of the control slide means disposed exteriorally of the housing, a further supporting ring is firmly connected to the control slide means at a position axially spaced from the first-mentioned supporting ring, the operating sleeve is disposed on the control slide means between the supporting rings, and in that one of the compression springs is disposed between the first-mentioned supporting ring and a first side of the operating sleeve and the other compression spring means is disposed between the further supporting ring and the opposite side of the operating sleeve.

10. A control valve according to claim 9, characterized in that recess means are provided in the first side and opposite side of the operating sleeve for accommodating respective ends of the spring means.

11. A control valve according to one of claims 1 or 2, characterized in that the valve sealing means includes a pair of axially-spaced sealing members mounted on the control slide means, each sealing member including a firm elastic annular portion seated on the control slide means and soft elastic sealing lips projecting from each side of the elastic annular portion.

12. A control valve according to claim 11, characterized in that the detent means includes annular grooves provided in the control slide means, and spring means mounted on the operating sleeve for lockingly engaging the respective annular grooves with a sufficient force to withstand a force of a compression of the compression springs.

13. A control valve according to claim 12, characterized in that a supporting ring is firmly connected to an end of the control slide means disposed exteriorally of the housing, a further supporting ring is firmly connected to the control slide means at a position axially spaced from the first-mentioned supporting ring, the operating sleeve is disposed on the control slide means between the supporting rings, and in that one of the compression springs is disposed between the first-mentioned supporting ring and a first side of the operating sleeve and the other compression spring means is disposed between the further supporting ring and the opposite side of the operating sleeve.

14. A control valve according to claim 13, characterized in that recess means are provided in the first side and opposite side of the operating sleeve for accommodating respective ends of the spring means.

* * * * *